United States Patent [19]

Karthauser et al.

[11] Patent Number: 5,337,517
[45] Date of Patent: Aug. 16, 1994

[54] TRANSFERABLE GROWING TRAY APPARATUS

[75] Inventors: Bradley C. Karthauser; Paul D. Lindsay, both of Cedarburg, Wis.

[73] Assignee: Envigro, Inc., Menomonee Falls, Wis.

[21] Appl. No.: 968,826

[22] Filed: Oct. 30, 1992

[51] Int. Cl.⁵ .............................................. A01G 9/04
[52] U.S. Cl. .................................. 47/71; 206/423
[58] Field of Search ............... 47/71, 60 NL, 18 R; 220/571; 206/423, 557

[56] References Cited

U.S. PATENT DOCUMENTS

| | | | |
|---|---|---|---|
| 2,188,880 | 1/1940 | Lewis et al. | 47/61 |
| 3,352,450 | 11/1967 | Rawlins | 220/571.1 |
| 3,604,150 | 9/1971 | Baumann | 47/66 |
| 3,852,912 | 12/1974 | Diller | 206/423 |
| 3,938,730 | 2/1976 | Detzel et al. | 206/557 |
| 3,965,614 | 6/1976 | Kienholz | 47/61 |
| 4,291,494 | 9/1981 | Knablein et al. | 47/60 NL |
| 4,754,874 | 7/1988 | Haney | 206/459.5 |
| 4,856,672 | 8/1989 | Sullivan | 220/571 |
| 4,887,388 | 12/1989 | Waltel, Jr. | |
| 4,962,855 | 10/1990 | Holmquist | |
| 5,022,183 | 6/1991 | Bohlmann | |

FOREIGN PATENT DOCUMENTS 2218887A 11/1989 United Kingdom ................... 47/71

Primary Examiner—Ramon S. Britts
Assistant Examiner—Joanne C. Downs
Attorney, Agent, or Firm—Reinhart, Boerner, Van Deuren, Norris & Rieselbach

[57] ABSTRACT

An improved growing tray apparatus including means for moveable positioning the tray with respect to a support surface such that the tray and/or the surface may be transferred while the tray is in use. The apparatus incorporates a side wall configuration which permits the tray to be secured on a pallet or similar support structure and moved therewith, but does not interfere with plant care and nurture. Off-season storage is also facilitated by the side wall configuration. Choice of construction material enhances the benefits available through use of this apparatus.

1 Claim, 2 Drawing Sheets

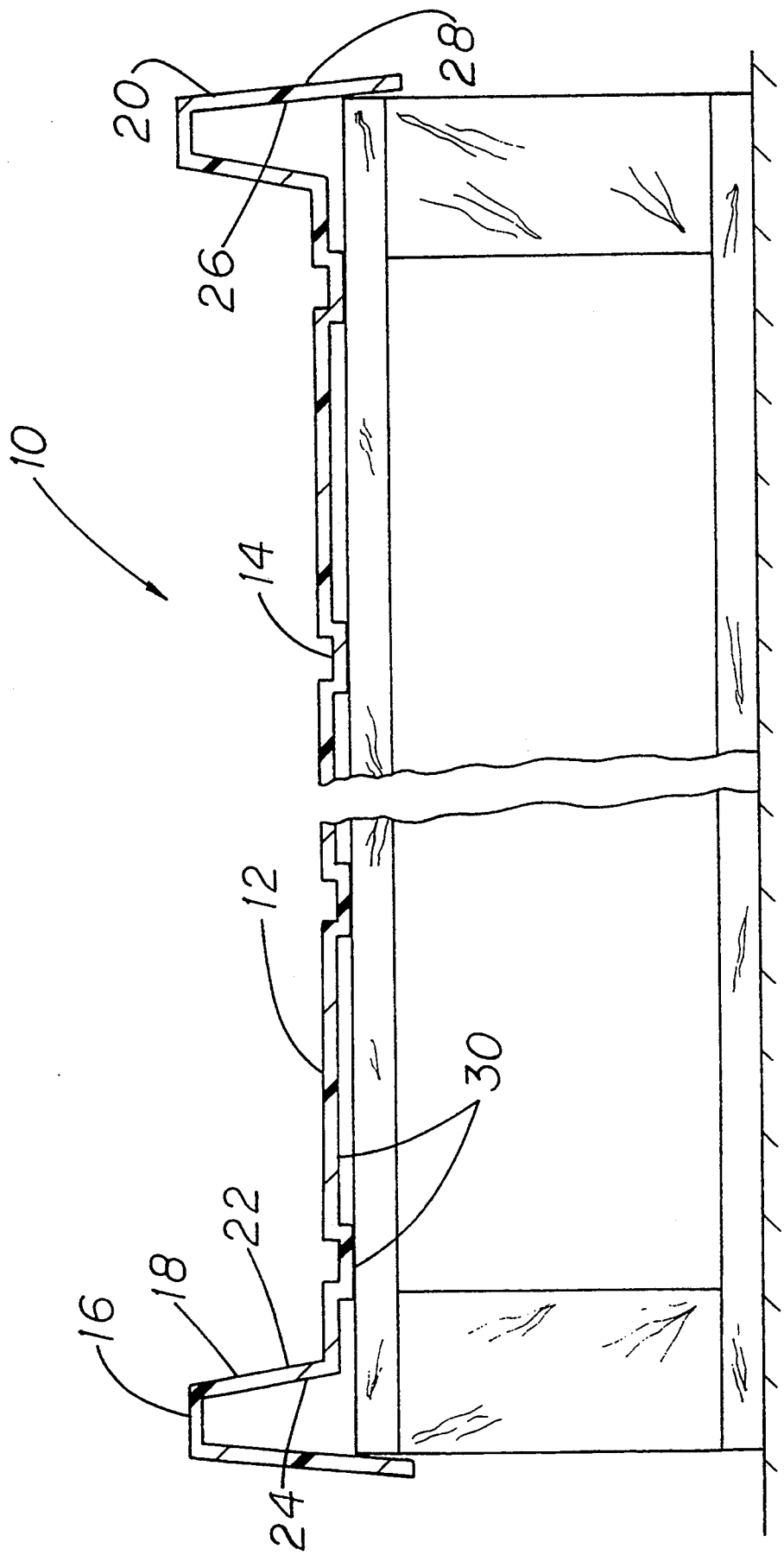

TRANSFERABLE GROWING TRAY APPARATUS

FIELD OF THE INVENTION

This invention is related generally to greenhouse and similar commercial plant cultivation and, more particularly, to growing trays for retaining containers and nurturing the plants therein.

BACKGROUND OF THE INVENTION

Many greenhouse and nursery operations process hundreds, if not thousands, of individual plant seedlings. As a result, an equal number of individual pots or containers must likewise be handled. Economies of scale can only be utilized if such operations become mechanized or automated. As described in U.S. Pat. Nos. 4,684,013, 4,962,855, and 5,022,183, loading trays have been developed with cavities shaped in general conformance with the shape of a pot and spaced in such a manner as to fit over multiple inverted pots simultaneously. While growing trays of this sort alleviate initial handling concerns, they do not promote and advance the state of plant care and nurture.

The search for an effective, integrated system for commercial plant cultivation has been an ongoing concern in the art. One approach, which has been used with certain success involves use of an open tray with cavities for individual pots in conjunction with a centrally-disposed watering tube, as described in U.S. Pat. Nos. 4,887,388 and 3,613,309, respectively. Such systems of the prior art rely on an array of stand-offs on each pot to raise the plant container above the induced water level and ensure circulation of fluid and air among the plants. Excess water flows out of the tray through openings in the upper portion of the tray wall.

However, the prior art has associated with it a number of significant problems and deficiencies. Most are related to restricted utility, and result from the type and configuration of the growing trays currently used.

One major problem is that current bench systems are immovable and growing trays of the prior art are not designed or constructed to be movable while in use. If moving many weighted containers is necessary, each must be handled individually, rather than together while in the tray. As a consequence, watering and related care must be interrupted or discontinued. If placed upon a pallet or a similar support system, such trays may be moved only with the risk of sliding off the pallet or loss of contents.

A related problem stems from the fact that certain plant varieties may require periodic shade or refrigerated temperatures at certain points in their growth cycle or under certain weather conditions. Even if growing trays of the prior art permitted the containers to be moved collectively, prolonged exposure to cooler temperatures would cause the trays to crack or otherwise be damaged under the stress and weight conditions.

Another serious problem is caused by the fact that growing trays are often subjected to long periods of intense sunlight, in particular, the ultra-violet or "UV" component thereof. As a result and at an extra cost, a UV-inhibitor is often incorporated into the material from which the trays are constructed. Even when an additive of this sort is included therein, the functional life of a tray is short and lengthened only marginally.

The materials of the prior art tend to develop and hold a static electrical surface charge. This is extremely undesirable characteristic in that such a charge attracts and holds dirt and/or vegetative material which, in turn, promotes the growth of bacteria, algae, and fungi harmful to plant life.

In summary, a considerable number of drawbacks and problems exist in the art relating to growing trays. There is a need for a growing tray which will accommodate a variety of horticultural demands and enable growers to better utilize the available technology.

OBJECTS OF THE INVENTION

It is an object of this invention to provide a growing tray overcoming the problems of the prior art, including those mentioned above.

It is an object of this invention to provide a growing tray which is fully movable while in use, such that watering and related care need not be interrupted.

Another object of this invention is to provide a growing tray arranged and configured in such a way as to be used in conjunction with a pallet or related support system.

Another object of this invention is to provide a growing tray composed of an ultra-violet light resistant and anti-static materials such that the tray maintains its structural integrity over numerous growing seasons and promotes plant growth by inhibiting the propagation of disease-causing bacteria and the like.

These and other important objects will be apparent from the descriptions of this invention which follow.

SUMMARY OF THE INVENTION

This invention is an improved growing tray apparatus for greenhouse and related use. The invention overcomes certain well-known problems and deficiencies, including those outlined above.

An important aspect of this invention is a novel support and positioning component, including a preferred side wall configuration. The inventive arrangement allows a growing tray to be placed upon a pallet or similar such support system and transferred therewith while in use without lateral movement and loss of content. Alternatively, the tray may be moved directly off the ground, mechanically or otherwise. The inventive arrangement likewise allows stacking for off-season storage. The tray may be used, therefore, to maximize growing conditions and promote economic efficiency.

This invention is a tray apparatus including means for movably positioning the tray with respect to the surface on which it is placed such that it may be transferred securely. The positioning means comprises a plurality of supporting members extending substantially downward and below the lower surface of the tray bottom.

In preferred embodiments, the supporting members are extensions of the tray side walls, where each wall has at least one supporting member. In highly-preferred embodiments, the supporting members are substantially contiguous about the combined peripheral dimension of the tray side walls, and the tray is composed of an ultra-violet light resistant, temperature-stable, anti-static material.

Likewise, in highly-preferred embodiments, each side wall comprises attached internal and external wall sections, where each section is spaced apart from the other and has both an inner and outer section face. The internal wall section is inwardly downward tapered, while the external wall section is outwardly downward tapered. To maximize utility, the external wall section extends below the lower surface of the tray bottom.

As already noted, a growing tray which is transferable while in use—either by way of physically retaining plants or providing them water, nutrients, hormones, etc.—has certain distinct advantages. Depending upon the sensitivity of the plant involved, it may be beneficial to plant growth and, thus, economical to maintain a pre-set or programmed care regimen even if space or environmental considerations dictate moving the tray. The ability to transfer loaded trays and/or the support systems on which they are placed, without collapse and content loss, enhances efficiency, as well. The unique side wall configuration described herein permits such advantages to be realized with an accompanying increase in productivity.

The practical situation most often encountered, which illustrates the benefits to be derived from this inventive tray, is that where plants periodically require cooler temperature conditions or a respite from intense sunlight. The solution lies in the ability to transfer large numbers of containers to a shaded or refrigerated area quickly and efficiently.

Where transfer is made to a refrigerator or the like, any gain in efficiency would be lost if the tray material did not retain a degree of flexibility over prolonged exposure to lower temperatures under typical stress and weight conditions. The tray apparatus of this invention is composed of a material which retains its structural integrity at temperatures where trays of the prior art crack, break, or otherwise fail.

Likewise, a tray constantly exposed to sunlight must be able to withstand the deleterious effects of ultra-violet radiation. The material of choice for the tray described herein is characterized by an inherent ability to inhibit photodegradation—without the need for an added UV-inhibitor. The benefits thereby derived include lower manufacturing costs and longer functional life, both of which further promote commercial productivity.

This invention is also preferably composed of a material which provides the tray an anti-static quality. A prolonged presence of soil and vegetative matter on a tray invariably leads to the growth of disease-causing fungi, bacteria, and algae. The situation is especially harmful where the tray is used in conjunction with an automated pumping and drainage system: contaminated nutrient fluid is introduced to additional trays until an entire plant population is exposed, often with drastic economic consequences. The inventive tray does not build up or hold a static charge, thereby minimizing the potential for the onset or spread of disease.

BRIEF DESCRIPTION OF THE DRAWINGS

FIG. 2 is a fragmentary sectional view of a preferred improved tray apparatus positioned and secured on a pallet.

DETAILED DESCRIPTIONS OF PREFERRED EMBODIMENTS

Figure 1:
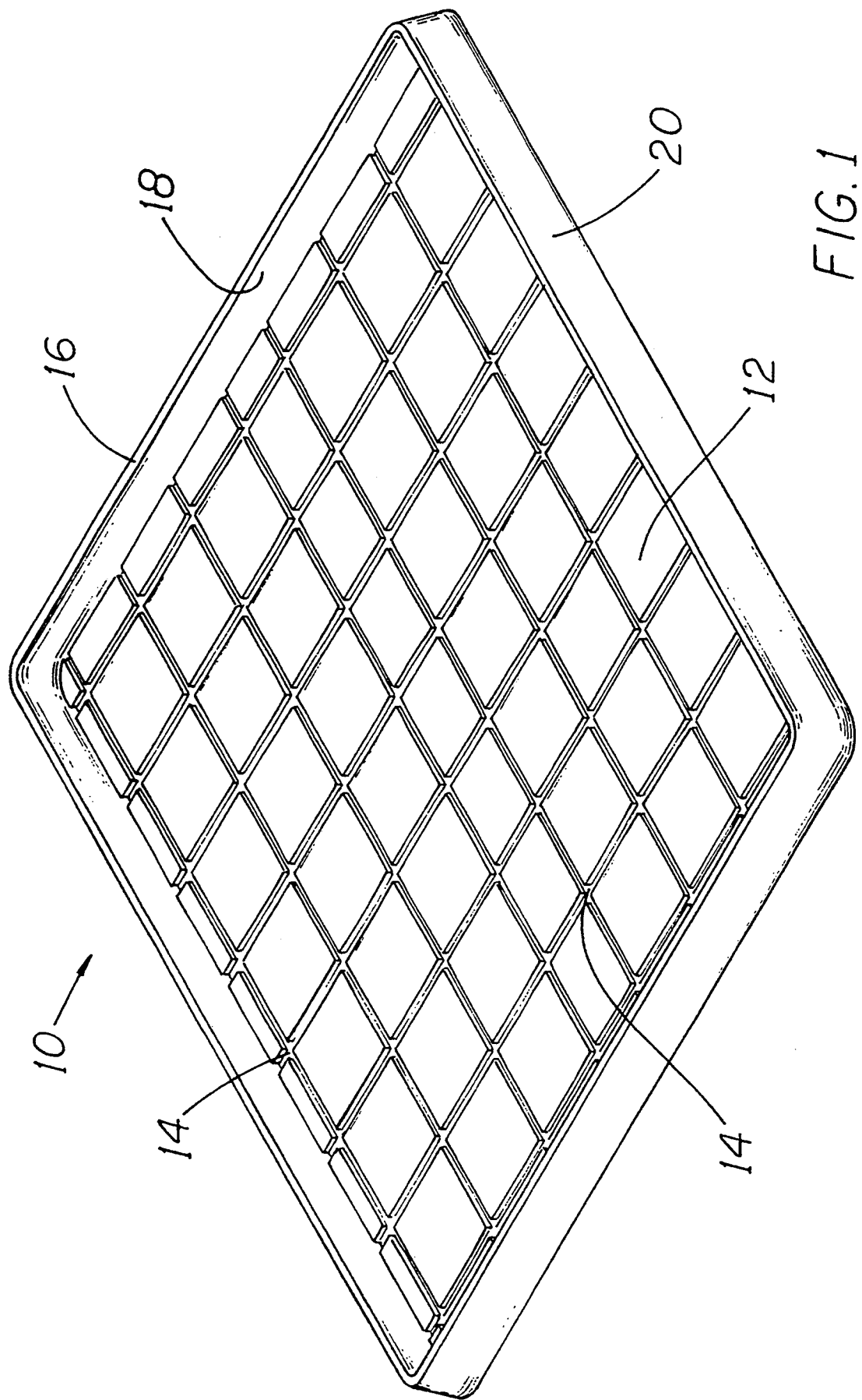
FIG. 1 is a full perspective view of a preferred improved tray apparatus in accordance with this invention.

The drawings illustrate an improved tray apparatus 10 which is a preferred embodiment of this invention. The apparatus includes a unique side wall configuration in combination with tray bottom 12 and fluid movement means 14. As shown in FIG. 1, each side wall 16 is comprised of internal wall section 18 and external wall section 20.

As best shown in FIG. 2, internal section 18 is attached to but spaced from external wall section 20. Internal section 18 has inner and outer faces 22 and 24, respectively. Likewise, external section 20 has inner and outer faces 26 and 28, respectively.

As best shown in FIG. 2, tray 10 may be movably positioned on a pallet or similar such surface, and is supported thereon through the engagement thereof by external section 20 of wall 16, which tapers outwardly downward. The position and placement of tray 10 on the pallet surface as both are moved, mechanically or otherwise, is further ensured by external wall section 20 extending below and beyond lower surface 30 of tray bottom 12. As such, placement and movement of tray 10 does not interfere with the function of fluid movement means 14. The inventive configuration allows tray 10 to be moved on a pallet or similar such surface while in use to either maximize growing conditions or space/production efficiency.

Off-season storage of tray 10 with others having a like shape and arrangement is facilitated by the novel configuration of side wall 16. The inwardly downward tapering internal section 18 of side wall 16, in combination with the outwardly downward tapering external section 24 of side wall 16, permits a stacking or "nesting" arrangement of one tray upon another. Such an inward/outward wall section combination serves to distribute accumulated weight and provide added stability when multiple trays are so stacked.

Plant care and nutrition may be accomplished through use of fluid movement means 14. Such activities need not be interrupted or discontinued if the plant containers retained by tray 10 must be transferred either intra- or interfacility. The positioning and support afforded by unique side wall 16 insures that such care may be continued during transfer. In such a manner, optimal growth conditions may be maintained without compromise by space, temperature, or other physical considerations.

Tray 10 may be made using a variety of materials apparent to those skilled in the art who are made aware of this invention. As noted above, preferred materials include those synthetic polymers which exhibit anti-static characteristics, are resistant to photodegradation, and remain structurally intact at lower temperatures, in particular. High-density polyethylene is highly preferred in that it meets these criteria and promotes the benefits available from a the tray described herein. The tray of this invention is typically of a size to be positioned securely on industry standard 40"×48" pallets. However, it may be dimensioned to meet a particular need.

While the principles of this invention have been described in connection with specific embodiments, it should be understood clearly that these descriptions are made only by way of example and are not intended to limit the scope of the invention. For example, this invention is contemplated for use with ebb and flow irrigation systems. Such fluid movement systems include inlet and outlet means used in conjunction with various methods of irrigation, from manual flooding to sophisticated, computerized pumping and drainage/recycling arrangements. Likewise, this invention is not limited to ground or common pallet support, but may be used in multiples with and to accommodate current elongated bench systems.

We claim:

1. An apparatus in combination with a support for retaining and transferring plant containers, said apparatus comprising:

a bottom portion disposed on an upper surface of said support and being constructed from an anti-static material, for container placement, including means for movement of fluid about or through said apparatus, said bottom portion having opposed upper and lower surfaces;

a plurality of side walls constructed from an anti-static material; and means connected to said side walls for removably engaging said support, said means consisting essentially of side walls, each said side wall having an inwardly downward tapered internal section and an outwardly downward tapered external section, said side wall external sections extending significantly downward beyond the lower surface of said bottom portion and engaging a correspondingly shaped periphery of said support.

* * * * *